United States Patent [19]

Boling

[11] Patent Number: 4,705,156
[45] Date of Patent: Nov. 10, 1987

[54] BELT FEEDER FOR ORIENTING AND TRANSPORTING ROUND SYMMETRICAL PARTS

[75] Inventor: Monte J. Boling, Fairfield, N.J.

[73] Assignee: Anderson Machine Works, Ridgefield Park, N.J.

[21] Appl. No.: 798,573

[22] Filed: Nov. 15, 1985

[51] Int. Cl.[4] ............................................. B65G 47/24
[52] U.S. Cl. .................................... 198/392; 198/443
[58] Field of Search ............... 198/392, 396, 398, 443, 198/444, 735, 836; 221/160, 167

[56] References Cited

U.S. PATENT DOCUMENTS

| | | |
|---|---|---|
| 841,471 | 1/1907 | Vallentine . |
| 1,191,938 | 7/1916 | Bazzoni . |
| 2,715,978 | 8/1955 | Sterling . |
| 2,792,099 | 5/1957 | Hefft . |
| 2,951,574 | 9/1960 | Craig .................................... 198/836 |
| 3,215,251 | 11/1965 | Gleason . |
| 3,610,399 | 10/1971 | Friedrich . |
| 3,726,385 | 4/1973 | Sterling . |
| 3,752,294 | 8/1973 | Harmon . |
| 3,815,731 | 6/1974 | Lupo et al. . |
| 3,860,145 | 1/1975 | Miller . |
| 3,881,596 | 5/1975 | Miller . |
| 3,924,732 | 12/1975 | Leonard . |
| 4,138,009 | 2/1979 | Strong ................................ 198/396 |
| 4,279,336 | 7/1981 | Henderson et al. ................ 198/443 |
| 4,401,203 | 8/1983 | McDonald et al. ................ 198/392 |

FOREIGN PATENT DOCUMENTS 2456764  6/1976  Fed. Rep. of Germany ...... 198/392

Primary Examiner—Joseph E. Valenza
Attorney, Agent, or Firm—Bacon & Thomas

[57] ABSTRACT

A feeding device is disclosed for orienting and transporting round symmetrical parts, such as caps or closures. The device has a receiving bin to receive a plurality of unoriented parts and a rotary disc located in a bottom portion of the receiving bin to successively agitate and transport the symmetrical parts. The disc is driven by an endless belt which also engages a drive pulley. The symmetrical parts are transported from the rotary disc by the endless belt and are caused to engage a balance rail located along their travel path. Properly oriented parts will continue to be transported on the endless belt, while those which are improperly oriented will fall off the endless belt and return to the receiving bin.

12 Claims, 6 Drawing Figures

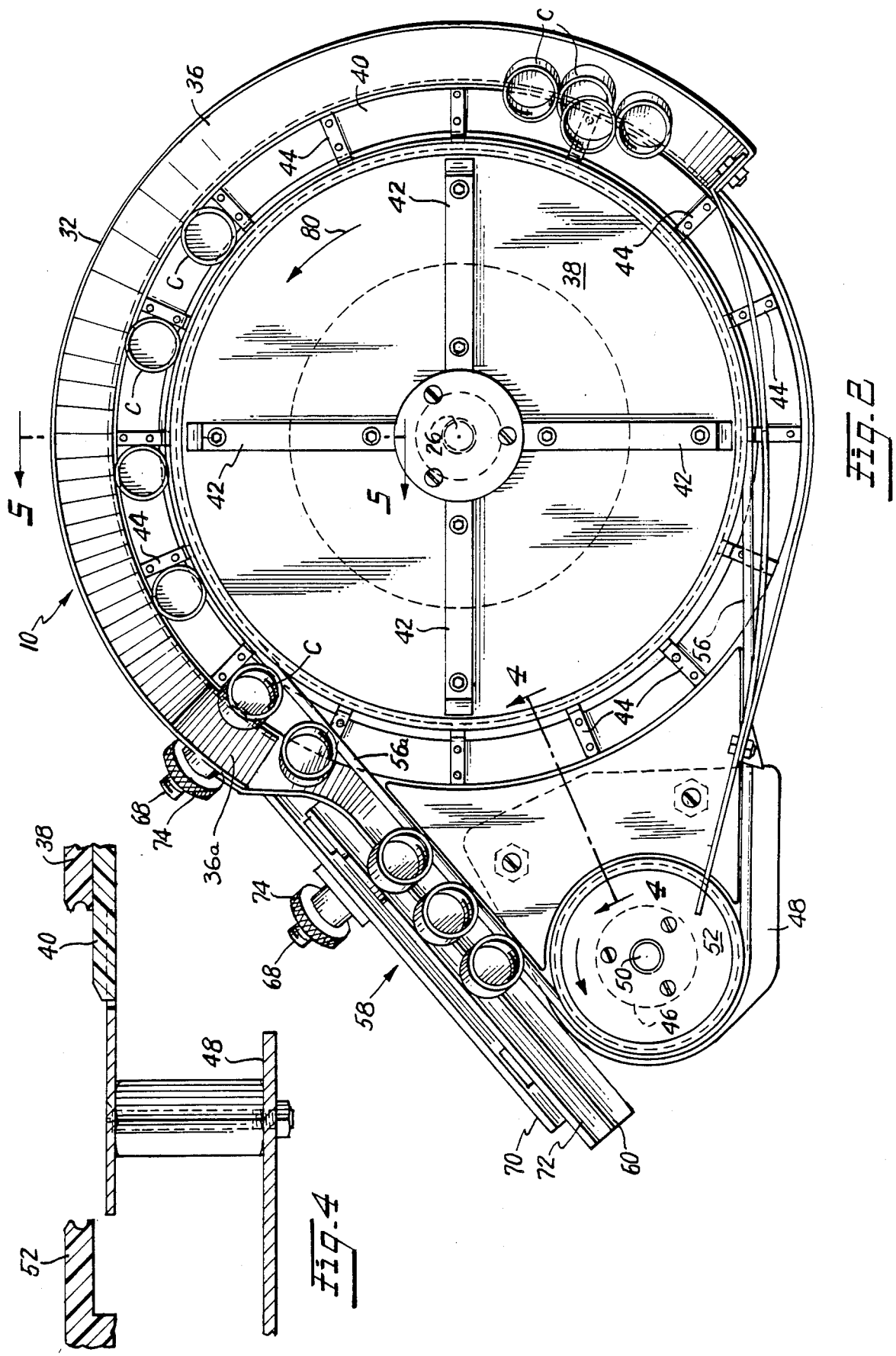

BELT FEEDER FOR ORIENTING AND TRANSPORTING ROUND SYMMETRICAL PARTS

FIELD OF THE INVENTION

The present invention relates to a feeding device for round symmetrical parts, specifically such a feeding device which places the parts in a specific orientation before transporting them from a receiving bin.

BRIEF DESCRIPTION OF THE PRIOR ART

Many devices have been developed over the years for orienting and/or transporting small symmetrical parts. These devices have found particular application in the bottling industry wherein it is necessary to properly orient a large number of bottle caps or closures such that they may be readily applied by automated assembly means. These devices must be able to place the closure in a specific orientation before transporting it to further apparatus in the process.

Typically, such devices comprise a bin or hopper for receiving the closures in a random orientation and provide means for placing the closures in a specific orientation. Usually the bin or hopper has a rotating portion which transports the closures onto a sorting mechanism. The sorting mechanism may utilize the center of gravity of the closure to determine its proper orientation. If the closure is placed on the sorting mechanism in its proper orientation, it will be passed onto the transporting mechanism and sent to the next station in the process. However, should the closure be placed on the sorting mechanism in an improper orientation, its center of gravity may cause it to fall off of the sorting device and back into the receiving bin or hopper.

The sorting devices have usually comprised a rotating wheel associated with the receiving bin, a guide track which receives the closures from the rotating bin and returns the improperly oriented closures thereto, or an endless chain which transports the closures from a stationary bin to a further transport mechanism. The improperly oriented closures will fall off the chain and return to the bin for further processing.

Although such devices have been reasonably successful, they have proven to be unduly complicated and, hence, have not obtained the maximum reliability. Quite obviously any breakdown or malfunction in the orienting and transporting device deleteriously affects the remaining operations along the automated assembly line. Also, when the device is used to orient different sized or shaped closures, the balancing apparatus must be accurately adjusted to insure that only the properly oriented closures remain on the sorting mechanism, while those improperly oriented will fall off. Again, in the prior art devices, this adjustment is time consuming and results in less than optimum downtime for the device.

SUMMARY OF THE INVENTION

The present invention provides a device for orienting and transporting round symmetrical parts, such as bottle caps or closures, that is simpler in construction and more easily adjustable than the prior art devices. The device according to the invention provides a receiving bin for receiving plurality of the closures in a random orientation and a rotary disc which forms the bottom of the receiving bin for transporting the closures. An endless belt member interconnects the rotary disc to the drive pulley of a power source in order to supply the rotary force which causes the disc to rotate. The endless belt means extends partially around the rotary disc to provide the driving force and to contact the symmetrical parts. The rotating disc and the endless belt means are located in substantially parallel planes which are oriented at an acute angle to the horizontal. The receiving bin defines a slanted portion adjacent to the periphery of the rotary disc to direct the symmetrical parts toward the rotary disc. Radially oriented agitator bars affixed to the disc transport the symmetrical parts such that they rest upon the endless belt means.

The endless belt means serves to transport the closures from the receiving bin and into contact with a balance rail means located adjacent a portion of the endless belt. the interrelationship of the balance rail and the belt is such that properly oriented parts have their center of gravity disposed on the side of the belt toward the balance rail and, therefore, remain on the endless belt to be transported to a further device. Those symmetrical parts which are improperly oriented have their center of gravity disposed on the side of the endless belt away from the balance rail and fall back into the receiving bin for further sorting.

The device utilizes a single power source which, through the endless belt drive means, not only provides the driving force for the rotating disc, but also serves to transport and orient the parts.

BRIEF DESCRIPTION OF THE DRAWINGS

FIG. 2 is a top plan view of the device, viewed in the direction of line 2—2 of FIG. 1.

FIG. 4 is an enlarged, partial sectional view taken along line 4—4 in FIG. 2.

DETAILED DESCRIPTION OF THE PREFERRED EMBODIMENT

Figure 1:
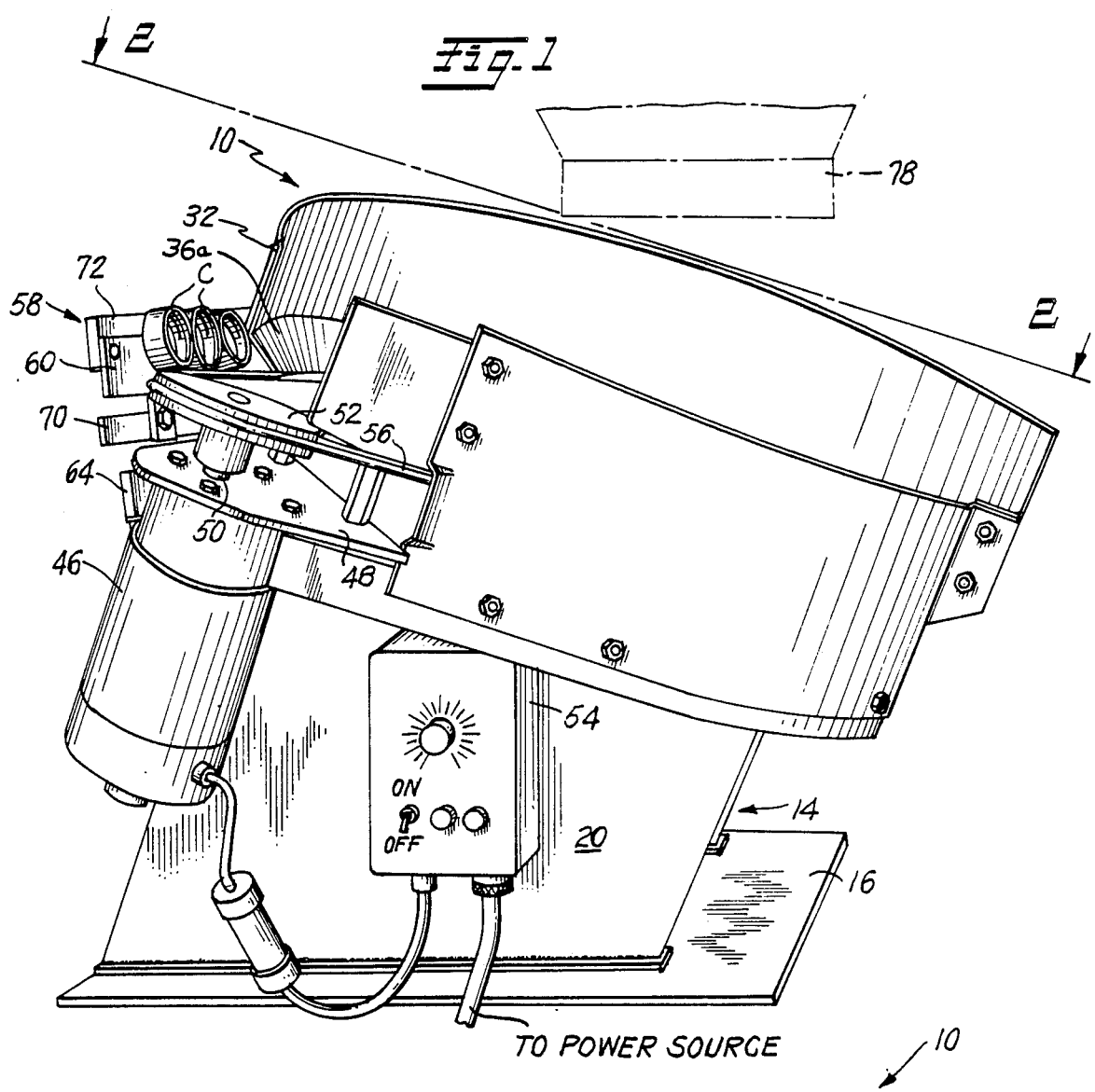
FIG. 1 is a side elevational view of the feeding device according to the present invention.
Figure 5:
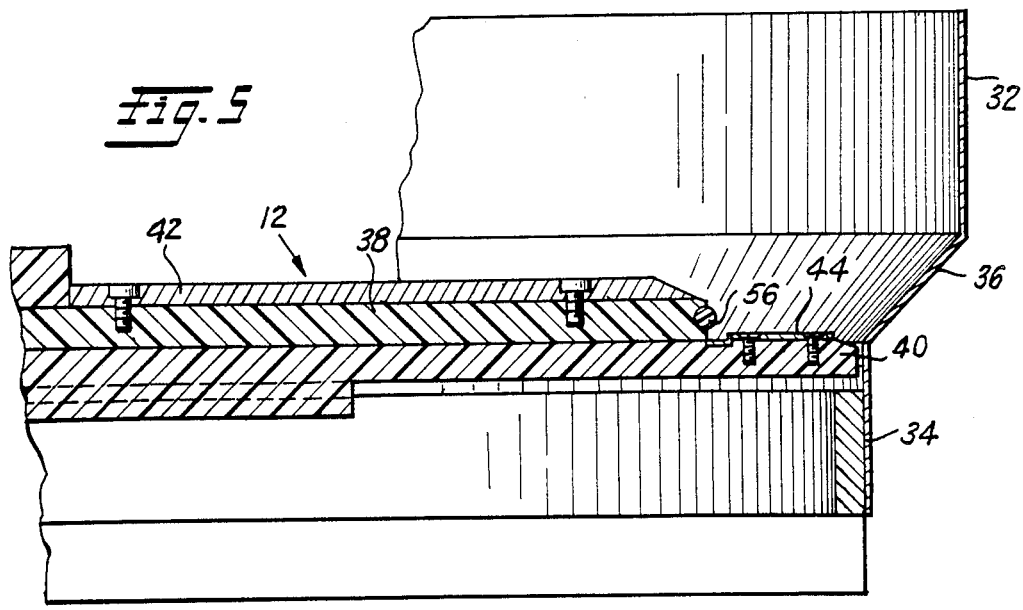
FIG. 5 is an enlarged, partial sectional view taken along line 5—5 in FIG. 2.
Figure 3:
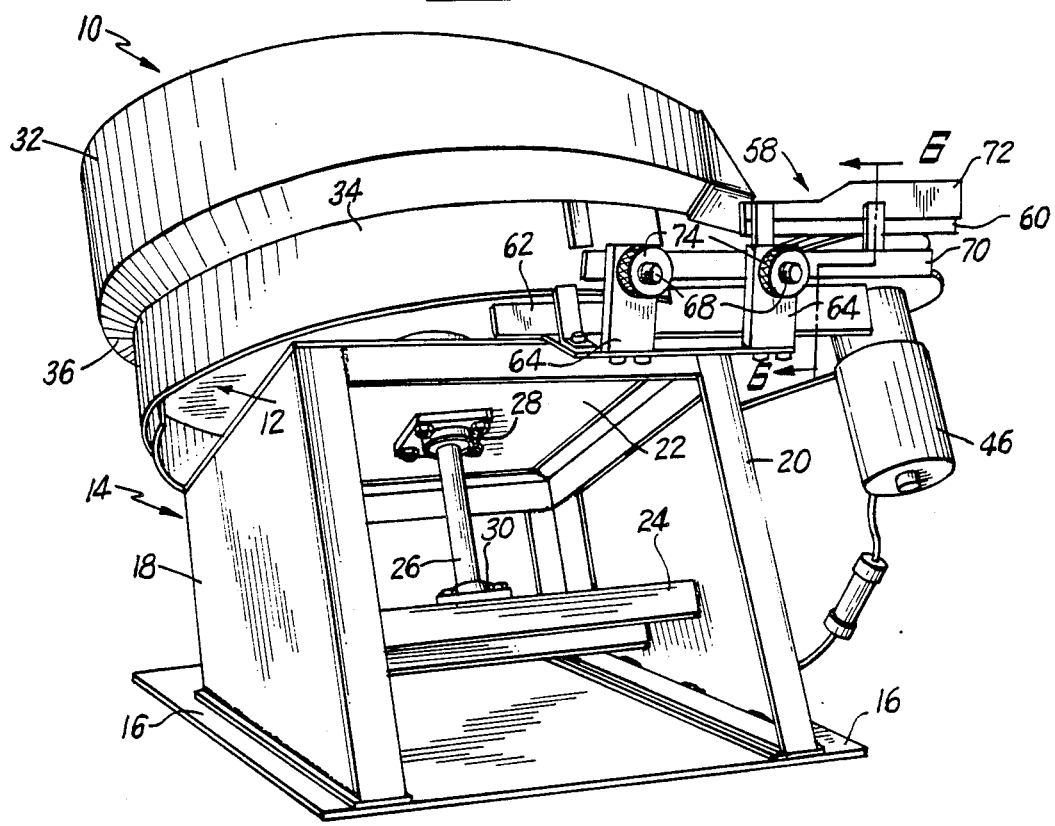
FIG. 3 is a perspective view of the feeding device as seen from the left in FIG. 1.

As best seen in FIGS. 1, 3 and 5, the feeding device according to the present invention comprises a receiving bin 10 having a rotary disc 12 forming its bottom portion, and a base structure 14 which supports the receiving bin 10 and rotatably supports the rotary disc 12. Base structure 14 may comprise base plate 16 having side members 18 and 20 rigidly attached thereto. Cross members 22 and 24 serve to rotatably support shaft 26, attached to rotary disc 12, via bearing blocks 28 and 30. The rotary disc 12 is rotatably supported such that it rotates in a plane which is oriented at an acute angle with the horizontal direction.

Receiving bin 10 comprises upper side Wall 32 and lower side wall 34 which is stationarily attached to the base structure 14. Slanted wall portion 36 interconnects the upper side wall 32 and the lower side wall 34 and is slanted outwardly and upwardly as shown in FIG. 5.

Rotary disc 12 comprises a center or first circumferential portion 38 and a peripheral or second circumferential portion 40. As shown in FIG. 5, the thickness or height of center portion 38 is greater than that of peripheral portion 40. Radially oriented agitator bars 42 may be affixed to central portion 38 while radially oriented agitator bars 44 are connected to peripheral portion 40. The rotary disc 12 is attached to shaft 26 which, as noted above, is rotatably supported in base structure 14.

Power source 46 is attached to base structure 14 via attaching bracket 48. Power source 46 may be a variable speed D.C. motor having output shaft 50 with drive pulley 52 mounted thereon. A controller mechanism 54 may also be attached to the base structure 14 and electrically connected to an electric power source and to the motor 46 so as to provide power on/off and variable speed controls for the drive motor. Both the drive motor 46 and the control unit 54 are standard, known items and their structure, per se, forms no part of the instant invention. Suffice to say that any commercially available units of sufficient size to rotate rotating disc 12 may be utilized with this invention.

Drive pulley 52 transmits its rotating motion to rotating disc 12 via endless drive belt means 56. Endless drive belt means 56 extends around the exterior of a portion of the periphery of central portion 38, as well as around a portion of drive pulley 52. The peripheries of these elements may be indented so as to receive a portion of the drive belt 56 and to prevent its slipping off during the rotating motion. Although belt 56 is shown as having a circular cross section and the indentations formed on drive pulley 52 and central portion 38 are shown as being generally semicircular in cross section, it is to be understood that other cross sectional shapes may be utilized without exceeding the scope of this invention. The belt drives the disc, of course, by frictionally pulling same from one side of the disc.

Figure 6:
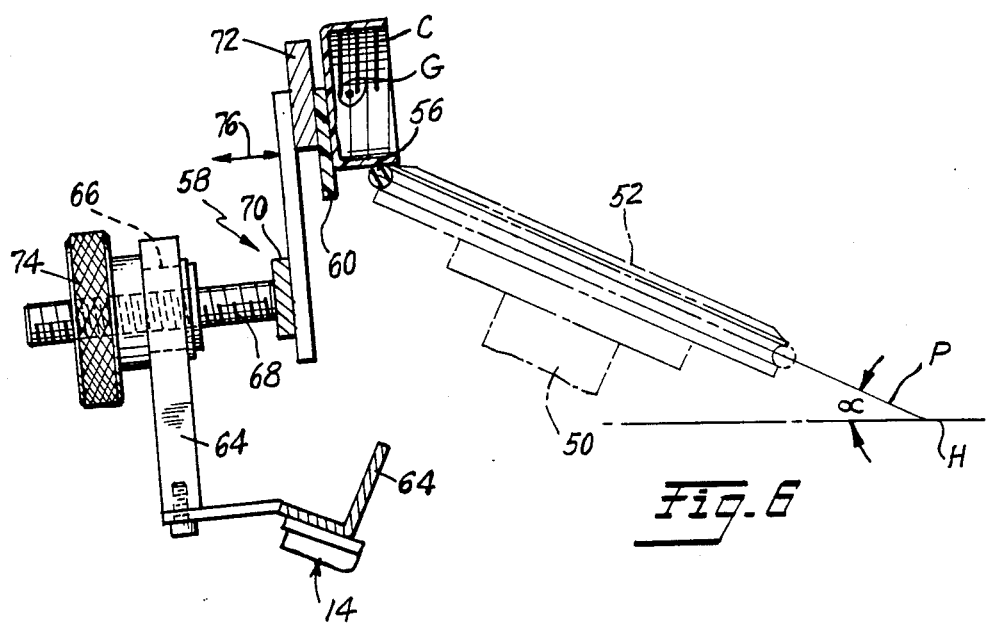
FIG. 6. is an enlarged, partial sectional view taken along line 6—6 in FIG. 3.

A balance rail means, generally indicated at 58, is attached to base structure 14 such that a balance rail 60 extends along a generally horizontal, tensioned driving portion 56a of the endless belt 56 between the drive pulley 52 and the rotary disc on the side of disc 12 pulled by belt 56. Mounting bracket 62 is fixedly attached to base structure 14 such that portions 64 extend generally upwardly and define an opening 66 therethrough. Threaded stud members 68 are attached to balance rail 60 via members 70 and 72. Threaded studs 68 extend through openings 66 and engage knob 74, as shown in FIG. 6. Knob 74 is rotatably retained in bracket member 64 such that, as the knob is rotated, rail member 60 moves in the direction of arrows 76 to adjust its position relative to endless belt member 56.

Endless belt 56 moves in a plane P substantially parallel to the plane of rotation of rotary disc 12. Plane P is disposed at an acute angle $\alpha$ with respect to a generally horizontal plane H, as shown in FIG. 6. Belt portion 56a constitutes a transport portion of the belt extending tangentially away from the circumference of central disc portion 38.

In operation, a plurality of round, symmetrical parts, such as closures C are placed in receiving bin 10 through hopper 78 such that they assume a random orientation in the receiving bin. The closures C may also be manually placed in the receiving bin 10 without exceeding the scope of this invention. The slanted wall portion 36 of receiving bin 10 directs the plurality of closures C onto rotary disc 12 which is rotating in the direction of arrow 80 in FIG. 2. The caps are transported on the peripheral portion 40 of the rotary disc 12 by radially extending agitator bars 44. During this period of movement, the closures C are also in contact with endless belt member 56.

The closures C remain on the peripheral portion 40 of the rotary disc 12 until they reach the point at which the endless belt member portion 56a leaves tangential contact with the central portion 38 of the rotary disc. At this point, the closures C bear against portion 36a of slanted wall portion 36 while being transported along with the movement of the endless belt 56 until they assume the semi-upright position shown in FIG. 6. It will be noted (FIG. 2) that slanted wall portion 36a and drive belt portion 56a converge towards each other to cause tilting action of the closures C. The closures continue to move along with ehe endless belt 56 and slide along the balance rail 60. The balance rail 60 is oriented such that, if the closures are properly oriented, as shown in FIG. 6, the center of gravity G (FIG. 6) of the closure C is located between the endless belt 56 and the balance rail 60 to keep the closure C balanced on the endless belt 56. Such properly oriented closures C continue to be transported by endless belt 56 until they are deposited in further transporting means (not shown).

The relationship between the balance rail 60 and the endless belt member 56 is such that improperly oriented closures C will have their center of gravity located on the side of endless belt member 56 away from the balance rail 60 and, thus, will fall off of the endless belt member 56 and back into receiving bin 10. Continued rotation of the rotary disc 12 causes contact between the closures C in the receiving bin and the agitator bars 42 and 44 so as to constantly change the orientation of the closures C remaining in the bin such that all will eventually be placed in their proper orientation.

Endless belt member 56 is maintained under sufficient tension between drive pulley 52 and rotary disc 12 to insure that no significant sag takes place between these members which would cause properly oriented closures C to fall back into the receiving bin or to permit improperly oriented closures C to be transported by the endless belt member.

The foregoing is provided for illustrative purposes only and should not be construed as in any way limiting this invention, the scope of which is defined solely by the appended claims.

What is claimed is:

1. A parts orienting and transporting system comprising:
    a generally planar rotatable disc means supported for rotation in an inclined plane from horizontal so as to always present an upper disc portion that is elevated with respect to the remainder of the disc, the disc including first and second stepped circumferential portions of different diameters, the first circumferential portion having a smaller diameter than the second circumferential portion and being disposed above the latter;
    a rotary drive means;
    and endless drive belt means extending from the rotary drive means and around the first circumferential portion of the disc means in driving relationship, a driving tensioned side of the belt defining a transport portion extending substantially horizontally between the drive means and the first circumferentially portion of the disc means, said transport portion diverging tangentially away from said first circumferential portion;
    a stationary parts retaining wall extending generally perpendicularly above the plane of the disc means and along the second circumferential portion thereof, said wall including a slanted portion closet the disc means inclined upwardly and away from the second circumferential portion of the disc means, said wall terminating adjacent the tangentially diverging transport portion of the drive belt means so as to define a part tilting area of the wall whereat the diverging transport portion of the drive belt means and the adjacent slanted portion of the wall converge towards each other to cause upward tilting of parts carried by the second circumferential portion of the disc and transported by the disc between the part tilting area of the wall and the transport portion of the belt drive means;

a balance rail means disposed along and adjacent said transport portion of the drive belt means in spaced parallel relationship and arranged to form a continuous extension of the tilting portion of said wall, said rail means comprising a part support surface extending to one side of and above said transport portion of the drive belt means, said part support surface and said transport portion of said drive belt means defining a part support and transport system for receiving parts disposed on the second peripheral portion of the disc means and carried thereby to the transport portion of the drive belt means whereat said parts are tilted upright by the part tilting area of said wall, and for transporting said upright oriented parts in a balanced condition away from the disc means during operation of the system.

2. A parts orienting and transporting system as claimed in claim 1, said transport system including balance adjusting means for adjusting the spatial relationship between said part support surface and said transport portion of said drive belt means to thereby alter the balance position of a part carried by the part support and transport system.

3. A parts orienting and transporting system as claimed in claim 1, wherin the radial distance between said drive belt means disposed around said first circumferential portion of the disc means and said wall corresponds to a major dimension of a part to be oriented and transported, whereby when said part is disposed on said second circumferential portion of the disc means said part is disposed with a major dimension located between the belt drive means and the sloping wall portion.

4. A parts orienting and transporting system as claimed in claim 3, wherein said parts are annular cap closures having a center of gravity disposed towards the closed end of the cap and said major dimension is the cap diameter; and further wherein said cap closures are tilted on their side by the tilting portion of the wall and carried on their side by the support and transport system, said support and transport system arranged so that the cap closures are balanced thereon only when the center of gravity thereof is disposed toward the part support surface relative to the transport portion of the drive belt means.

5. A parts orienting and transporting system as claimed in claim 4, said second circumferential portion of the disc means including agitator bars extending above the surface of the disc means for engaging parts disposed on said second circumferential portion.

6. A parts orienting and transporting system as claimed in claim 4, wherein the vertical distance separating the drive belt means and second circumferential portion of said disc means is less than the height of a cap closure part to be oriented and transported when the cap is disposed in the second circumferential portion with its diameter parallel to the disc means; said drive belt means extending externally of said first circumferential portion; whereby, one side of the cap closure is engaged by the drive belt means when the cap is disposed on the second circumferential portion of the disc means with its diameter parrallel to the disc means.

7. A parts orienting and transporting system comprising a tilted bin comprising a bottom defined by an article supporting disc means tilted from horizontal so as to present upper and lower disc portions at all times, and a fixed side wall extending generally perpendicular to the disc means closely adjacent its outer periphery over at least a portion of the circumference of the disc means from the lower disc portion to the upper disc portion in the direction of rotation of the disc means;

a drive means for said article supporting disc means comprising a drive pulley, means for driving the drive pulley and a continuous drive belt means extending around the pulley and the disc means in tensioned, driving relationship;

said drive belt means including a transport portion constituting a tensioned driving portion extending substantially horizontally between the upper portion of the disc means and the pulling side of the drive pulley;

said wall including a parts orienting portion adjacent the transport portion of said drive belt means adjacent its tangential intersection with the drive belt means;

a balance rail means extending parallel to said drive belt transport portion and arranged to cooperate therewith for supporting parts resting on the transport portion in balanced condition.

8. A parts orienting and transporting system as claimed in claim 7, including adjusting means for spatially orienting the rail means relative to the belt transport portion to adjust the balance position of parts resting on the transport portion.

9. A parts orienting and transporting system as claimed in claim 7, said disc means including agitator bars arranged to engage parts disposed in said bin and carry said parts with said disc means from its lower portion to its upper portion, and to dispose said parts on said transport portion of said belt drive means at its tangential intersection with said disc means.

10. A parts orienting and transporting system as claimed in claim 7, and disc means including stepped portions of different diameter so as to present an inner circumferential portion and an outer circumferential portion;

said drive belt means extending around said inner circumferential portion in driving relationship;

said outer circumferential portion including said agitator bars and extending adjacent said wall means, whereby parts disposed in said bin tend to fall towards the lower portion of the disc means onto the outer circumferential portion of said disc means and to be transported on said outer circumferential portion toward the transport portion of said drive belt means.

11. A parts orienting and transporting system as claimed in claim 10, wherein the drive belt means extends around the outer periphery of said first circumferential portion of said disc means and the difference in diameter between said first circumferential portion and said second circumferential portion of said disc means defines a parts carrying area, said parts carrying area having a radial dimension between the external periphery of said first circumferential portion and said wall means corresponding substantially to one dimension of parts to be oriented and transported, whereby such parts are retained between said belt drive means and said wall during transportation on said disc means.

12. A parts orienting and transporting system as claimed in claim 11, said wall means including a lower, sloped surface slanting upwardly and away from the periphery of said disc means, whereby parts in said bin tend to fall towards the disc means away from the wall means.

* * * * *